July 18, 1950 W. E. WADSWORTH 2,515,432

INTERCOMMUNICATION SYSTEM

Filed July 8, 1948 2 Sheets-Sheet 1

INVENTOR.
William E. Wadsworth
BY
Marles & French
ATTORNEYS

July 18, 1950 W. E. WADSWORTH 2,515,432

INTERCOMMUNICATION SYSTEM

Filed July 8, 1948 2 Sheets-Sheet 2

INVENTOR.
William E. Wadsworth
BY
Quarles & French
ATTORNEYS

Patented July 18, 1950 2,515,432

UNITED STATES PATENT OFFICE 2,515,432

INTERCOMMUNICATION SYSTEM

William E. Wadsworth, Tampa, Fla.

Application July 8, 1948, Serial No. 37,547

3 Claims. (Cl. 179—37)

The invention relates to inter-communication systems, and more particularly those of the type having a remote controlled loud speaker.

The object of the invention is to provide a system of the character above described in which any substation can talk directly to any other substation.

A further object of the invention is to provide an intercommunication system that requires only one control mechanism and amplifying station which may be placed in any desired location and may be sealed against tampering. Each substation is provided with a loud speaker and a set of control buttons electrically connected with the control and amplifying station which includes all the relays used in the system. One control button per substation controls both talking and listening with another substation. One control button is provided at each substation to release or clear the system. The called partly simply answers from where he hears the call and does not have to go to a box, push a button or lever, before he can answer, thus saving time and objectionable inconveniences.

The invention further consists in the several features hereinafter set forth and more particularly defined by claims at the conclusion hereof.

Figure 1:
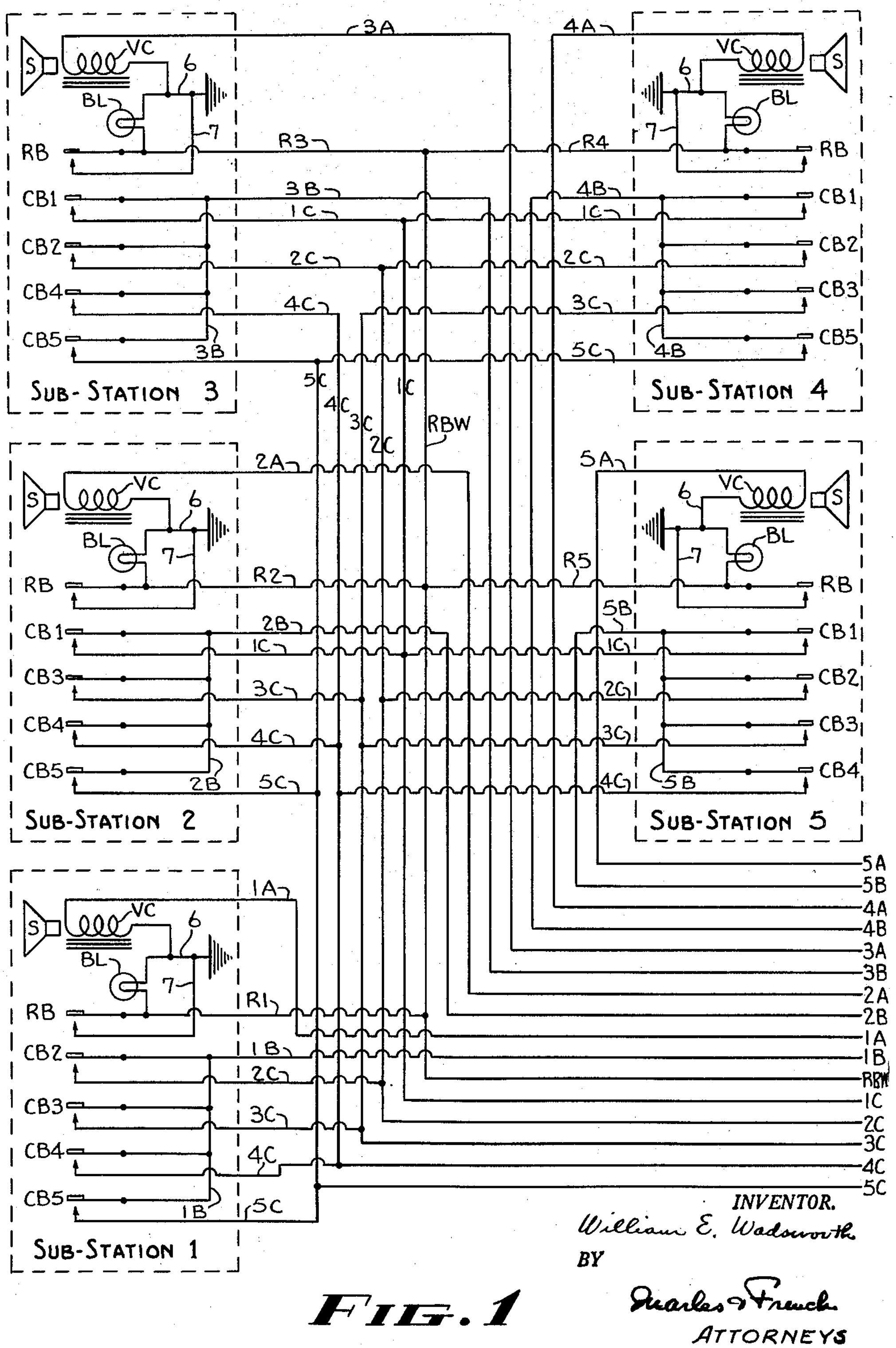
Fig. 1 is a diagrammatic view showing the substations and their wiring.

Referring to the drawings, I have shown five substations designated 1, 2, 3, 4, and 5, respectively. Each substation has a loud speaker S, one of whose terminals is connected by a conductor 6 to ground and the other of whose terminals for the different stations are connected, respectively, by the sound wires 1A, 2A, 3A, 4A, and 5A.

Each substation has four call buttons or circuit closures and one release button or circuit closure RB and a signal light BL. The call buttons for station 1 are designated at CB2, CB3, CB4, and CB5. The call buttons for station 2 are CB1, CB3, CB4, and CB5. The call buttons for station 3 are CB1, CB2, CB4, and CB5. The call buttons for station 4 are CB1, CB2, CB3, and CB5. The call buttons for station 5 are CB1, CB2, CB3, and CB4. The call buttons for station 1 have a common return conductor 1B, those of station 2 a return conductor 2B, those of station 3 a return conductor 3B, those of station 4 a return conductor 4B, and those of station 5 a common return conductor 5B. There are five call button conductors 1C, 2C, 3C, 4C, and 5C. The call buttons at each station are connected to these call button conductors, all of the call buttons CB1 being connected to conductor 1C, all of the call buttons CB2 being connected to conductor 2C, all of the call buttons CB3 being connected to conductor 3C, all of the call buttons CB4 being connected to conductor 4C, and all of the call buttons CB5 being connected to conductor 5C.

One terminal of the release buttons RB for the different stations is connected, respectively, by conductors R1, R2, R3, R4, and R5, respectively, to a busy and release wire or conductor RBW, and the other terminal of these release buttons is connected by a conductor 7 to its ground conductor 6. A signal or busy light BL for each station is connected across the conductor 6 and the conductor connecting the release button of this station with the busy and release wire RBW.

Figure 2:
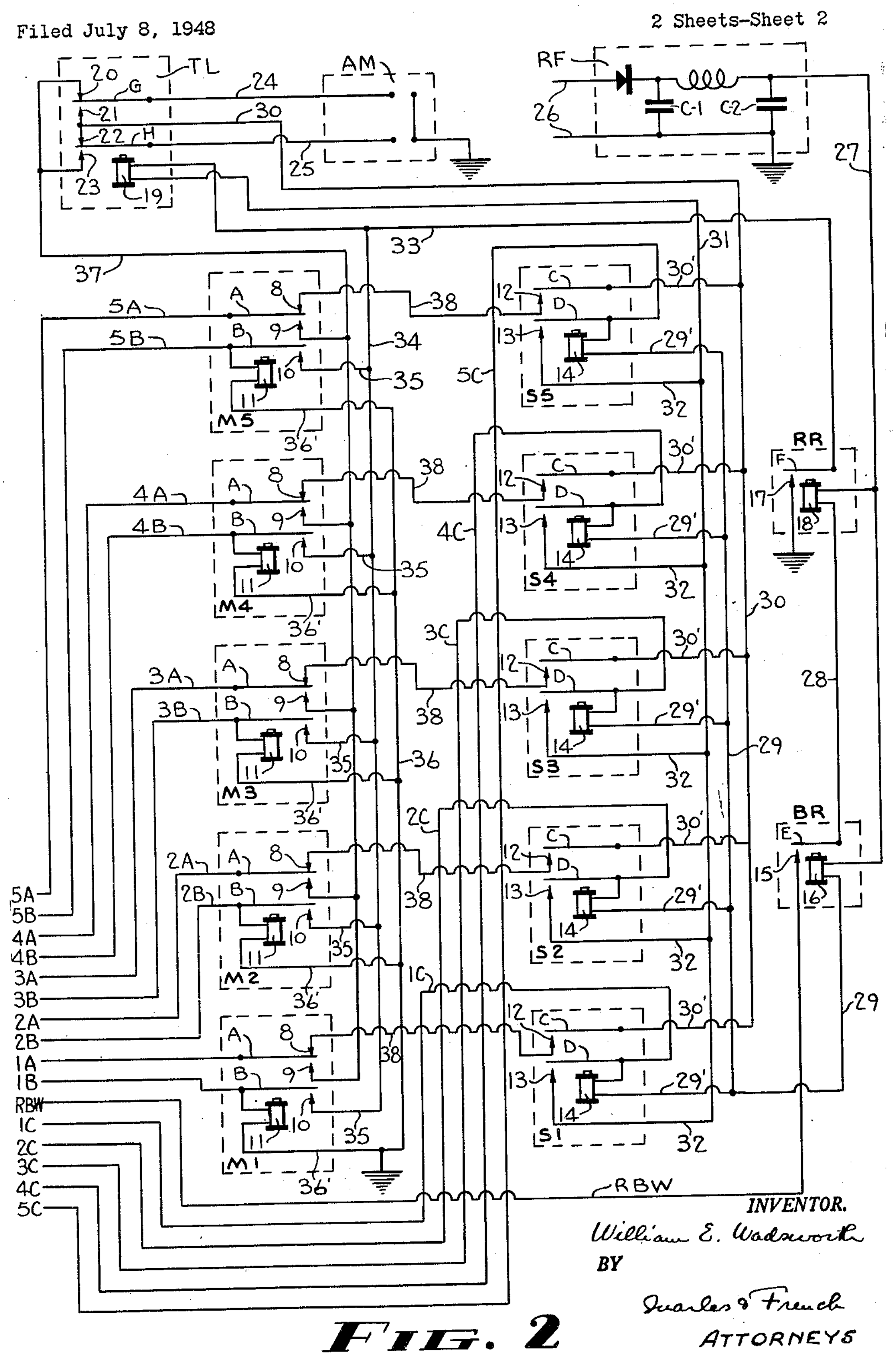
Fig. 2 is a diagrammatic view of the control and amplifying station with its wiring which connects up with the substations of Fig. 1.

The sound wires or conductor 1A to 5A, respectively, the return conductors 1B to 5B, respectively, the busy release wire, RBW, and the call button conductors 1C to 5C, respectively, lead to the single control and amplifying station shown in Fig. 2.

Referring to Fig. 2, the control and amplifying station includes a plurality of relays M1 to M5, respectively, connected to the sound wires 1A to 5A and button return wires 1B to 5B of the substation, a plurality of relays S1 to S5, respectively, connected to the call button conductors 1C to 5B, an amplifier AM, a talk listen relay TL, a rectifier and filter RF, a busy relay BR, and a release relay RR.

Each of the relays M1 to M5 has a vibratory movable contact A cooperating with fixed contacts 8 and 9, a vibratory or movable contact B cooperating with a fixed contact 10, and an operating coil 11.

Each of the relays S1 to S5 has a vibratory or movable contact C cooperating with a fixed contact 12, a vibratory or movable contact D cooperating with a fixed contact 13, and an operating coil 14.

The busy relay BR has a vibratory or movable contact E cooperating with a fixed contact 15, and an operating coil 16.

The release relay RR has a vibratory or movable contact F cooperating with a fixed grounded contact 17, and an operating coil 18.

The talk listen relay TL has an operating coil 19, a vibratory or movable contact G cooperating with fixed contacts 20 and 21, and a vibratory or movable contact H cooperating with fixed contacts 22 and 23.

A conductor 24 connects the input side of the amplified AM with the contact G, and a conductor 25 connects the output side of said amplifier with the contact H.

The current supply wires 26 from any suitable source of alternating current connect as shown with the rectifier and filter RF, one of these lines being grounded and the other connected by a conductor 27 with one side of the coils 16, 18. The other side of the coil 18 is connected by conductor 28 with the contact E. The other side of coil 16 is connected by a conductor 29 and branch conductors 29′ to one side of the coils 14. The other side of each coil 14 is connected to the contact D of its associated relay.

The conductor RBW connects with the fixed contact 15.

The contacts D of the relays S1 to S5 are also, respectively, connected to conductors 1C to 5C.

The contacts 21 and 22 of the talk listen relay are connected to a common conductor 30 with which the contacts C of the relays S1 to S5 are connected by branch conductors 30′. Relay TL also has one side of its coil 19 connected by conductor 31 with branch conductors 32, each connected with a fixed contact 13 of relays S1 to S5. The other side of coil 19 is connected by a conductor 33 with the contact F of the release relay RR.

Conductor 33 is also connected to a common conductor 34 which is connected by branch conductors 35 to the fixed contacts 10.

One side of the coils 11 of relays M1 to M5 is connected by branch conductors 36′ to a common ground conductor 36, and the other side of these coils connect, respectively, with the button return wires 1B to 5B.

The contacts 20 and 23 of the talk listen relay TL are connected to a common conductor 37 to which the fixed contacts 9 of the relays M1 to M5 are connected. The contact 8 of each M relay is, respectively, connected by a conductor 38 with the fixed contact 12 of each S relay as shown.

The sound wires 1A to 5A, respectively, connect with the contacts A for the relays M1 to M5, and the button return wires 1B to 5B, respectively, connect with the contacts B of said relays M1 to M5.

With the above described arrangement if station 3 wishes to talk to station 5, the call button CB5 at station 3 is depressed and released and any sound that enters the loud speaker at station 5 hat now is acting as a dynamic microphone will be heard at the loud speaker at station 3. Tracing the circuit from the DC input from the rectifier RF, the current flows through conductor 27, coil 16 of relay BR, conductor 29, conductor 29′, and coil 14 of relay S5, conductor 5C, button CB5 of substation 3, button return wire 3B, coil 11 of relay M3 and its conductor 36′, and conductor 36 to ground, and through ground to the other supply conductor, thus energizing coil 16 to move contact E to a closed position with contact 15 so that current may then pass from conductor 27 through coil 18, conductor 28 to busy and release wire RBW and through the busy lamps BL in all the substations and conductors 6 to ground, but as these lamps take only a small amount of current release relay RR does not close. Coil 11 of relay M3 and coil 14 of relay S5 being energized, these relays are operated. Contact B of relay M3 then contacts contact 10, and contact D of relay S5 then contacts contact 13, thereby allowing current to pass through coil 19 from conductors 34, 33 and 32, 31 and closing a locking circuit through coil 19 of relay TL when button CB5 of substation 3 is released since current then flows from conductor 27, coil 16, conductor 29, coil 14 of relay S5, contacts D and 13, conductor 32, conductor 31, coil 19, conductors 33, 34, conductor 35, and contacts 10 and B of relay M3, coil 11 of said relay M3, conductors 36′, 36 to ground. Current then passes through the coil 19 of the relay TL which pulls up closing contacts G and 21 and H and 23, and relays S5 and M3 remain locked up. The sound is now heard at substation 5, the circuit being from the ground through the VC (voice coil) of substation 5, sound wire 5A through contacts A and 8 of relay M5 (coil 11 of relay M5 not being energized) conductor 38, contacts 12 and C of relay S5, conductors 30′, 30, contacts 21 and G to input side of andio amplifier AM. The current is amplified and returns out through conductor 25 to contacts H and 23, conductor 37, contacts 9 and A of relay M3, sound wire 3A, VC of loud speaker at substation 3 to ground. Thus the momentary depression of button CB5 at substation 3 causes the operation of both of the loud speakers at substations 3 and 5.

To talk from substation 3 to substation 5 the cutton CB5 at substation 3 is again pressed, and this causes a short circuit across the coil 19 of the TL relay, since call button CB5 then acts to bridge the circuit including conductors 34 and 31, inverting the input and output of the andio amplifier AM causing the sound to pass over the same path as before but in the opposite direction so that the loud speaker at substation 3 then acts as a microphone to transmit the message to the loud speaker at substation 5 then acting as a loud speaker.

The inverting of the input and output of the amplifier when coil 19 is deenergized takes place because contact H moves from contact 23 to contact 22 and contact G moves from contact 21 to contact 20. When the party at substation 3 initiating the call has finished talking, he releases his call button CB5, thus relieving the short from coil 19 of the talk-listen relay and again reversing amplifier AM since contact H then moves into engagement with contact 23 and contact G moves into engagement with contact 21. Reversal of the AM then permits the called party at substation 5 to use the loud speaker at this station as a microphone and talk to substation 3 through the loud speaker at this station, since relay M3 is energized and contact A is in contact with contact 9. Thus after the initial closing and release of call button CB5 to lock in relays M3 and S5 between substations 3 and 5 conversation may be carried on, the button CB5 being closed while the party at substation 3 is talking and being released while the party at substation 5 is talking, but at no time does the party at the called station have to operate any buttons or levers. Upon termination of the conversation over the speakers at substations 3 and 5 the calling party at substation 3 depresses the release button RB at this station. This shorts the busy lamp BL permitting coil 18 of relay RR to pull up and move contact F into engagement with contact 17. This grounds relay M3 since contact F is connected by conductor 33 to conductor 34, branch conductor 35 of relay M3, contacts 10 and 13 of said relay and its coil 11 connected to ground through conductor 36. Coil 11 of relay M3 being deenergized, contact B of said relay moves to open position, thus opening the locking circuit for the relay M3. With the opening of the relay M3 and separation of contacts 10 and B thereof the circuit supplying coil 14 of relay S5 and including these contacts, conductor 35 for this relay, conductor 34, coil 19, conductors 31, 32, contacts 13 and D, coil 14, conductor 29, coil 16, and conductor 27 is opened so that relay S5 releases, and upon releasing the button RB at substation 3 the ground through coil 11 of relay M3 is removed, and the circuit is ready for another call. Only the substations that are talking with each other are active so that there is privacy between stations.

While I have shown the current supply as AC current and a rectifier to provide DC for operating the relays, any suitable source of DC current may be used.

For the purpose of claiming the invention the relays M1 to M5 may be designated calling relays and the relays S1 to S5 receiving relays, it being noted that there are as many of each of these relays as there are substations and that while a five substation system has been shown, from two to any number of substations may be used.

It is to be further noted that while the call and release buttons are shown as push button switches or closures, any other suitable manually operated type of circuit closure may be used and that by the term call button and release button I mean a circuit closure of any suitable form. However, it is to be noted that the push button switches herein shown are not of the lock in type.

While on operation the busy relay BR closes putting voltage on the busy lamps BL through the coil 18 of the release relay RR, the lamps BL are of low wattage and do not draw enough current to cause the coil 18 to close the release relay. Upon shorting the lamp BL by depressing the release button RB, the release relay coil 18 will then be energized to cut out the locking circuit as heretofore described.

The above described intercommunication system requires no master stations containing amplifiers at each master station but each substation can talk to any other substation, the talking being controlled by the party at the substation initiating the call.

I desire it to be understood that this invention is not to be limited to any particular form or arrangement of parts except in so far as such limitations are included in the claims.

What I claim as my invention is:

1. In an intercommunication system, the combination of a plurality of substations, each substation having a loud speaker with only one pair of conductors carrying the voice currents therefore, a control button for every other substation controlling both the talking and listening with another substation and a release button, a source of current, an electronic amplifier a single talk listen relay having an operating coil and reversible switches controlled by said coil, circuit connections between said switches and said amplifier, circuit connections between said switches, said loud speakers and said source of current including relay operated switches selectively controlled by said control buttons and connected in circuit with the operating coil of said talk listen relay, and means controlled by said release buttons for deenergizing the operating coil of said talk listen relay.

2. In an intercommunication system, the combination of a plurality of substations, each substation having a loud speaker with only one pair of conductors carrying the voice currents therefor, a control button for every other station and a release button, a source of current, an electronic amplifier, a single talk listen relay having reversible switches controlled thereby for connecting said amplifier with said source of current and the loud speakers of the calling and called substations, electrically controlled means including relays connected with said control buttons for establishing the circuit connections between the loud speakers of the calling and called substations and said amplifier, said means being controlled by the operation of a control button at one substation for establishing current flow from said source to the loud speakers of the calling and called substations and rendering said talk listen relay operative to connect said amplifier to the loud speaker of the called substation when said button at the calling station is in closed circuit position and to connect said amplifier to the loud speaker of the calling station when said button at the calling station is in open circuit position, and means controlled by said release buttons for releasing said talk listen relay and the relays of said electrically controlled means.

3. In an intercommunication system, the combination of a plurality of substations, each substation having a loud speaker with only one pair of conductors carrying the voice currents therefor, a control button for every other substation and a release button, a source of current, an electronic amplifier, a single talk listen relay in circuit with said amplifier and said loud speakers having an operating coil and reversible switches controlled thereby for connecting said amplifier with said source of current and the loud speakers of the calling and called substations, circuit control means between said substations, said source of current, amplifier and talk listen relay switches including two sets of relays, each relay of one set controlling a double throw switch having a movable contact and fixed contacts and a single throw switch, each relay of the other set controlling single throw switches, the movable member of each double throw switch being, respectively, electrically connected with one side of the loud speaker at one substation, one of the fixed contacts of each double throw switch being connected to one side of the talk listen relay switch, the single throw switch of the same relay electrically connecting one wire for a control button at one substation with the operating coil of the talk listen relay, one of the single throw switches of the other set of relays connecting said operating coil with the other wire of said control button and with the source of current, the other of said single throw switches of said other set of relays being connected to the other fixed contact of the double throw switch of the first named set and to the other side of the switch of said talk listen relay, the operation of a control button at calling substation acting to establish a talk-listen circuit with the desired called station through said talk-listen relay, amplifier and the loud speakers of the called and calling substations, further operation of said control button selectively controlling the output of said amplifier to either of the loud speakers of said called and calling substations.

WILLIAM E. WADSWORTH.

REFERENCES CITED

The following references are of record in the file of this patent:

UNITED STATES PATENTS

| Number | Name | Date |
|---|---|---|
| 2,146,362 | Thomsen | Feb. 7, 1939 |
| 2,162,369 | Campbell | June 13, 1939 |
| 2,249,456 | Campbell | July 15, 1941 |
| 2,269,141 | Campbell | Jan. 6, 1942 |

FOREIGN PATENTS

| Number | Country | Date |
|---|---|---|
| 223,981 | Great Britain | Oct. 31, 1924 |